United States Patent
Miyoshi

(10) Patent No.: US 8,340,187 B2
(45) Date of Patent: Dec. 25, 2012

(54) VIDEO TRANSMITTING APPARATUS AND VIDEO TRANSMITTING METHOD

(75) Inventor: Hidenobu Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 12/549,056

(22) Filed: Aug. 27, 2009

(65) Prior Publication Data

US 2010/0054337 A1 Mar. 4, 2010

(30) Foreign Application Priority Data

Sep. 4, 2008 (JP) ................. 2008-227500

(51) Int. Cl.
*H04N 7/28* (2006.01)
(52) U.S. Cl. .................. 375/240.16; 375/240.27
(58) Field of Classification Search ............. 375/240.16, 375/240.27
See application file for complete search history.

(56) References Cited

U.S. PATENT DOCUMENTS

| 4,371,895 A * | 2/1983 | Koga | 375/240.14 |
| 4,651,206 A * | 3/1987 | Ohki | 375/240.16 |

FOREIGN PATENT DOCUMENTS

| JP | 60-146588 | 8/1985 |
| JP | 60-162392 | 8/1985 |

* cited by examiner

*Primary Examiner* — Sath V Perungavoor
*Assistant Examiner* — Jeffery Williams
(74) *Attorney, Agent, or Firm* — Staas & Halsey LLP

(57) ABSTRACT

A video transmitting apparatus has a moving image encoding unit performing an encoding process using an intra-slice scheme; and a transmission monitoring unit detecting disconnection and recovery of a line between the moving image encoding unit and a video receiving apparatus. At a time of line disconnection, the moving image encoding unit performs an encoding process on a picture by putting reference restrictions on a motion vector so that a transmission error falls within a pixel macroblock line.

11 Claims, 9 Drawing Sheets

VIDEO TRANSMITTING APPARATUS AND VIDEO TRANSMITTING METHOD

CROSS-REFERENCE TO RELATED APPLICATIONS

This application is based upon and claims the benefit of priority of the prior Japanese Patent Application No. 2008-227500, filed on Sep. 4, 2008, the entire contents of which are incorporated herein by reference.

FIELD

The present invention relates to a video transmitting apparatus and a video transmitting method.

BACKGROUND

In general, the amount of data of video data is large. Therefore, when video data is transmitted to a receiving apparatus, a high-efficiency encoding process is performed. Examples of a high-efficiency encoding scheme are ISO/IEC, MPEG2, and MPEG4 (MPEG: Moving Picture Experts Group). When real-time communication is performed by using such an encoding scheme, a delay is lowered in encoding and decoding.

JP-A-60-162392 discloses an interframe encoding process for an image signal. The technology disclosed in JP-A-60-162392 performs encoding block by block in an N line. However, when motion compensation is performed by using a vector without limit, there is a possibility that an error may move or spread, making it impossible to eliminate the error.

Moreover, JP-A-60-146588 discloses the technology of prohibiting motion compensation using a motion vector during a previously-determined time period for an N line on which encoding has been performed.

The encoding schemes disclosed in JP-A-60-162392 and JP-A-60-146588 use a video transmission scheme which is required to provide a live telecast, or the like, in real time. When video is wirelessly transmitted outdoors, in particular, from a moving unit, a line is sometimes disconnected. With the technologies of JP-A-60-162392 and JP-A-60-146588, it takes some time before the video is restored in the receiving apparatus after the line is recovered.

SUMMARY

According to an aspect of an embodiment a video transmitting apparatus and a video transmitting method is provided that can shorten the time it takes for the video to be restored.

A video transmitting apparatus has a moving image encoding unit performing an encoding process using an intra-slice scheme; and a transmission monitoring unit detecting disconnection and recovery of a line between the moving image encoding unit and a video receiving apparatus, wherein, at a time of line disconnection, the moving image encoding unit performs an encoding process on a picture by putting (turning on) reference restrictions on a motion vector so that a transmission error falls within a macroblock line where the transmission error occurs, and, at a time of line recovery, the moving image encoding unit performs an encoding process on a picture by putting reference restrictions on a motion vector so that a transmission error does not spread over a lower region including a predetermined macroblock line.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF EMBODIMENTS

Hereinafter, with reference to the drawings, an embodiment of the invention will be described. In the following embodiment, as a moving image encoding scheme, an H.264 video transmission system which is a moving image encoding scheme standardized by ITU-T (International Telecommunication Union-Telecommunication Standardization Sector) is used.

Embodiment 1

Figure 1:
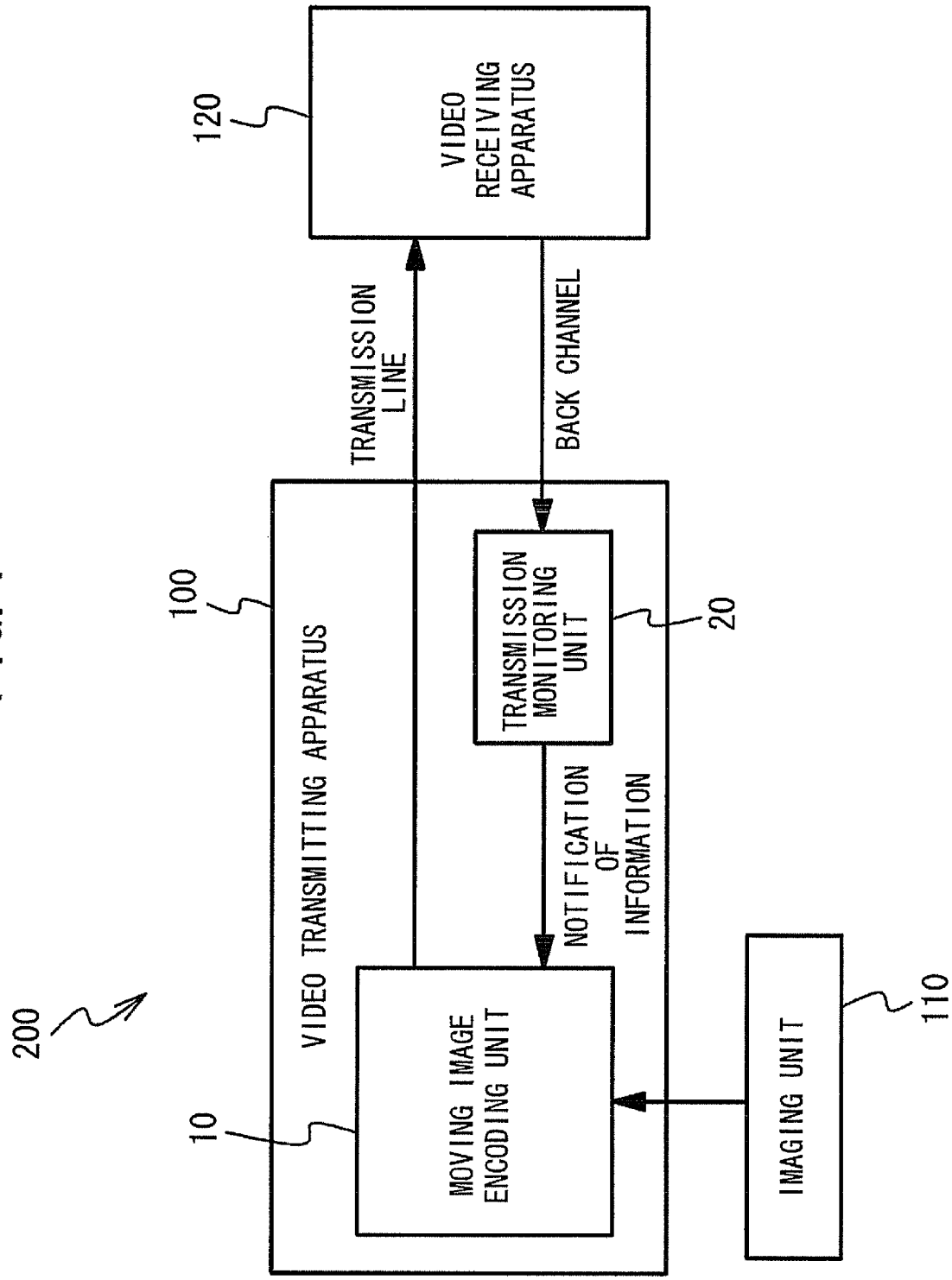
FIG. 1 is a block diagram showing the configuration of a video transmission system including a video transmitting apparatus in accordance with Embodiment 1.

FIG. 1 is a block diagram showing the configuration of a video transmission system 200 including a video transmitting apparatus 100 in accordance with Embodiment 1. As shown in FIG. 1, the video transmission system 200 includes the video transmitting apparatus 100, an imaging unit 110, and a video receiving apparatus 120.

Though not particularly limited, the imaging unit 110 is an imaging apparatus such as a television or video camera. The video transmitting apparatus 100 includes a moving image encoding unit 10 and a transmission monitoring unit 20. The moving image encoding unit 10 transmits a video stream to the video receiving apparatus 120 via a transmission line. The video receiving apparatus 120 transmits information obtained by the video receiving apparatus 120 to the transmission monitoring unit 20 via a back channel. Based on the information received from the video receiving apparatus 120, the transmission monitoring unit 20 notifies the moving image encoding unit 10 of information for controlling encoding.

Figure 2:
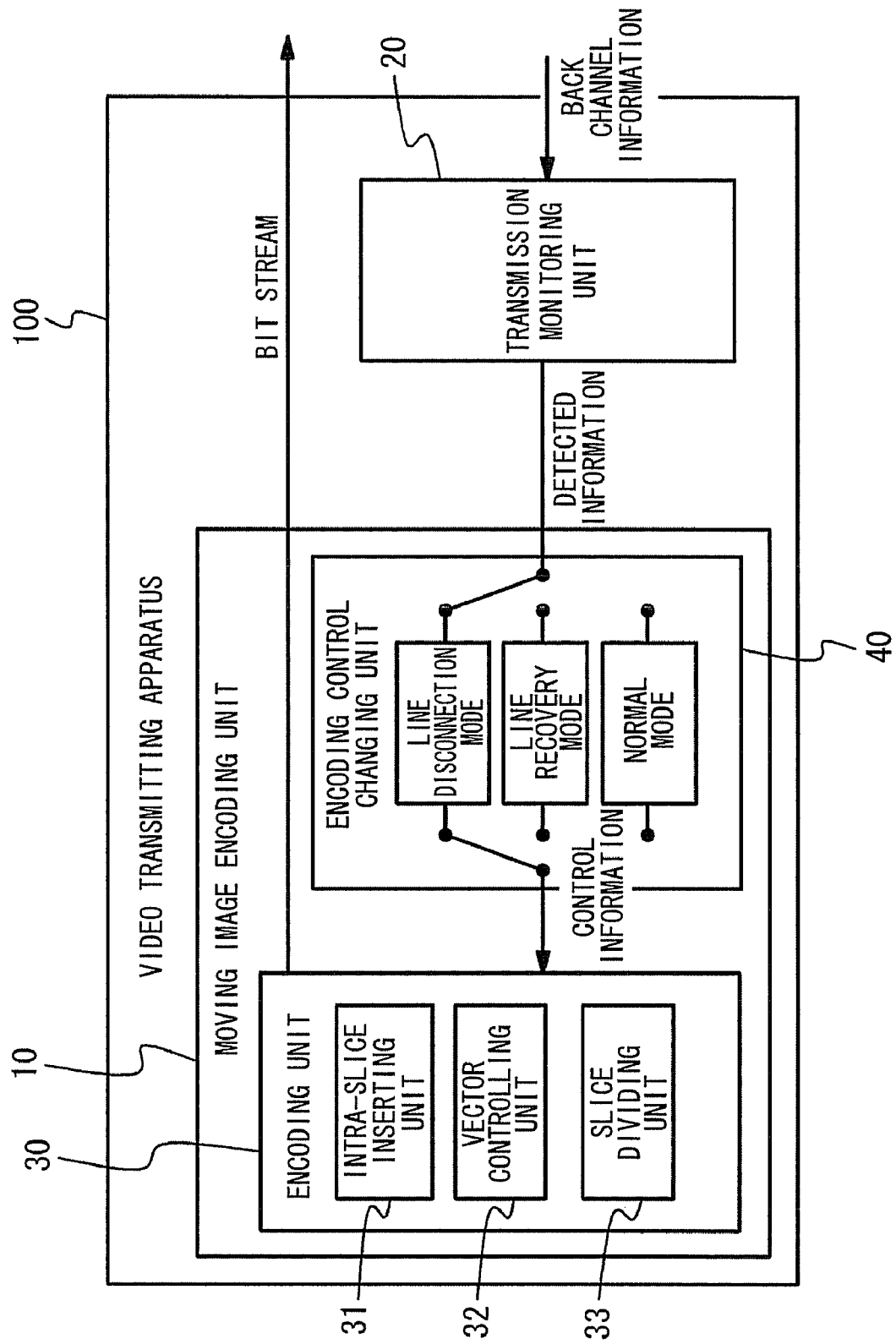
FIG. 2 is a functional block diagram of the video transmitting apparatus.

FIG. 2 is a functional block diagram of the video transmitting apparatus 100. As shown in FIG. 2, the moving image encoding unit 10 includes an encoding unit 30 and an encoding control changing unit 40, and the encoding unit 30 has an intra-slice inserting unit 31, a vector controlling unit 32, and a slice dividing unit 33.

The encoding unit 30 and the encoding control changing unit 40 are implemented by the execution of a video transmission program performing a video transmitting method. The video transmission program may be executed by dedicated hardware (for example, computing hardware), or may be executed by computer software.

The transmission monitoring unit 20 obtains information on a transmission line status based on back channel information from the video receiving apparatus 120. In this embodiment, the transmission monitoring unit 20 obtains information indicating disconnection of a transmission line between the video transmitting apparatus 100 and the video receiving apparatus 120 and information indicating connection thereof. Based on these information, the transmission monitoring unit 20 detects disconnection of the transmission line and recovery of the transmission line. When the transmission monitoring unit 20 detects disconnection of the transmission line, the transmission monitoring unit 20 outputs line disconnection information to the encoding control changing unit 40. When the transmission monitoring unit 20 detects recovery of the transmission line, the transmission monitoring unit 20 outputs line recovery information to the encoding control changing unit 40.

In this embodiment, the encoding unit 30 generates a bit stream complying with the moving image encoding scheme ITU-T H.264. The encoding control changing unit 40 outputs information required for encoding control to the encoding unit 30 according to the information inputted from the transmission monitoring unit 20. When line disconnection information is inputted from the transmission monitoring unit 20, the encoding control changing unit 40 outputs control information in the line disconnection mode to the encoding unit 30. When line recovery information is inputted from the transmission monitoring unit 20, the encoding control changing unit 40 outputs control information in the line recovery mode to the encoding unit 30. Moreover, when the transmission line is connected for a predetermined period of time or longer, the encoding control changing unit 40 outputs control information in the normal mode to the encoding unit 30.

Figure 3:
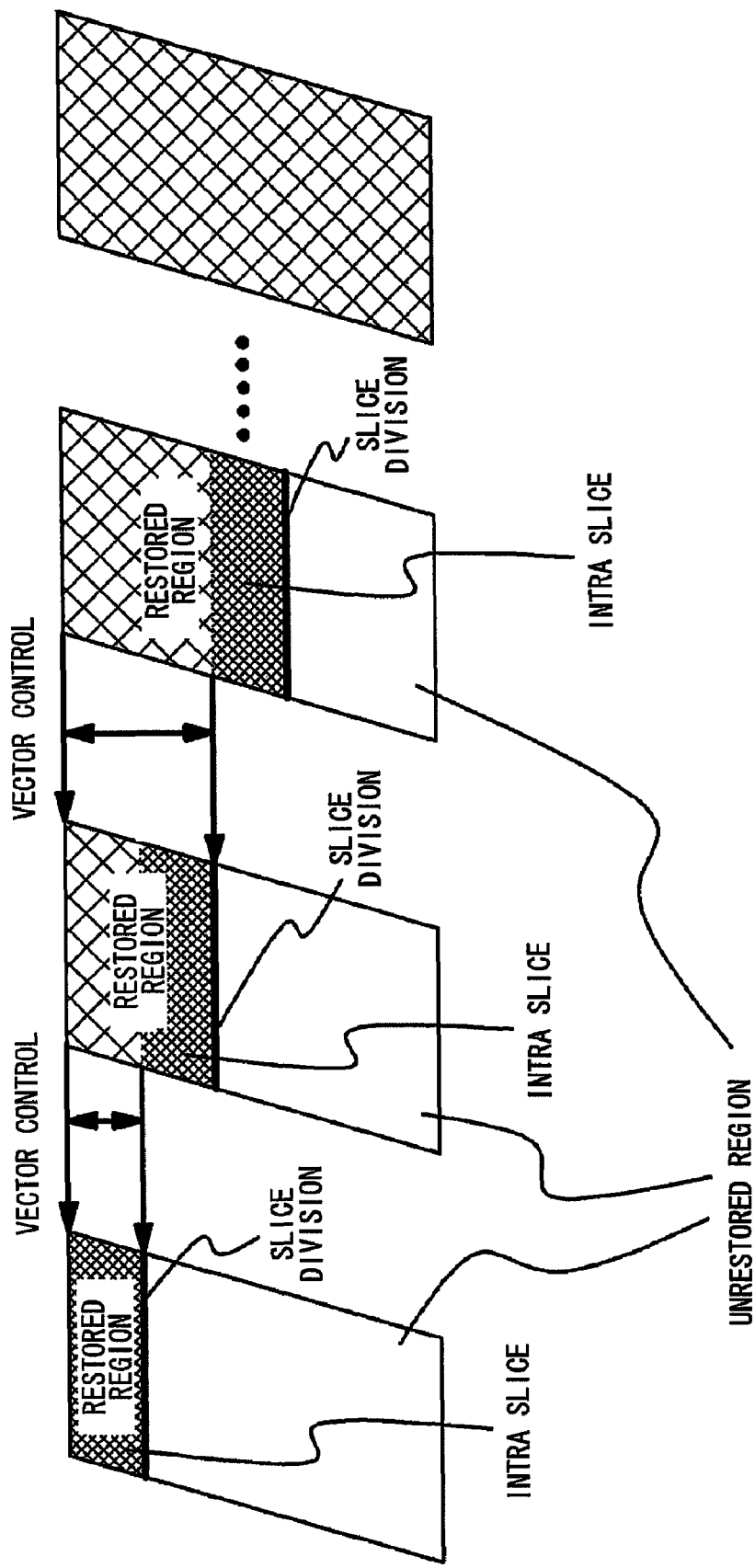
FIG. 3 is a schematic diagram for normal mode.

Next, the details of the normal mode, the line disconnection mode, and the line recovery mode will be described. FIG. 3 is a schematic diagram for normal mode. The normal mode adopts an intra-slice scheme which is a low-delay encoding scheme. For the sake of simplification, a method by which one intra slice is inserted into one picture (e.g., pictures 1, 2, or 3) is used.

In the intra-slice scheme, a P picture is used in which a predicted error is encoded by performing forward inter-picture prediction from the past picture. This picture is divided into blocks of 16×16 pixels. The pixel block is referred to as a macroblock, and a macroblock line may be referred to as a slice. The macroblocks include an intra-macroblock performing intra-picture encoding and an inter-macroblock performing inter-picture encoding. Here, in the intra-slice scheme, an intra-slice scheme encoding data in a certain slice as an intra-macroblock is used.

The intra-slice inserting unit 31 sequentially shifts the position of a macroblock line (or slice) to which an intra slice is applied toward a lower portion of the image plane on a picture-by-picture basis. In this case, the intra slice moves throughout the whole picture in a fixed period. As described above, as a result of the intra slice moving from an upper portion of the image plane toward a lower portion thereof, even when an error is present, the whole picture is refreshed (restored) when the intra slice moves and is back where the intra slice started. Moreover, for a region (an upper region) encoded by the intra slice after the occurrence of an error, the region is refreshed. Therefore, the vector controlling unit 32 puts (turns on) reference restrictions on motion vector prediction so that a region encoded by the intra slice after the occurrence of an error is set as a reference region for a motion vector at the time of encoding.

By performing encoding control in this way, for the video receiving apparatus 120, a region encoded by the intra slice after the occurrence of an error including the intra slice becomes a restoration completion region, and a region situated below the intra slice becomes an unrestored region. Therefore, when an error occurs in a received image, the video receiving apparatus 120 cannot reproduce a bit stream of the intra-slice scheme properly until the intra slice moves in the image plane and is back where the intra slice started. As a result, even when a picture in which the intra slice is inserted at some midpoint of the image plane is received first after the start of reproduction operation, restoration of video cannot be achieved until the intra slice moves in the image plane and is back where the intra slice started.

Figure 4:
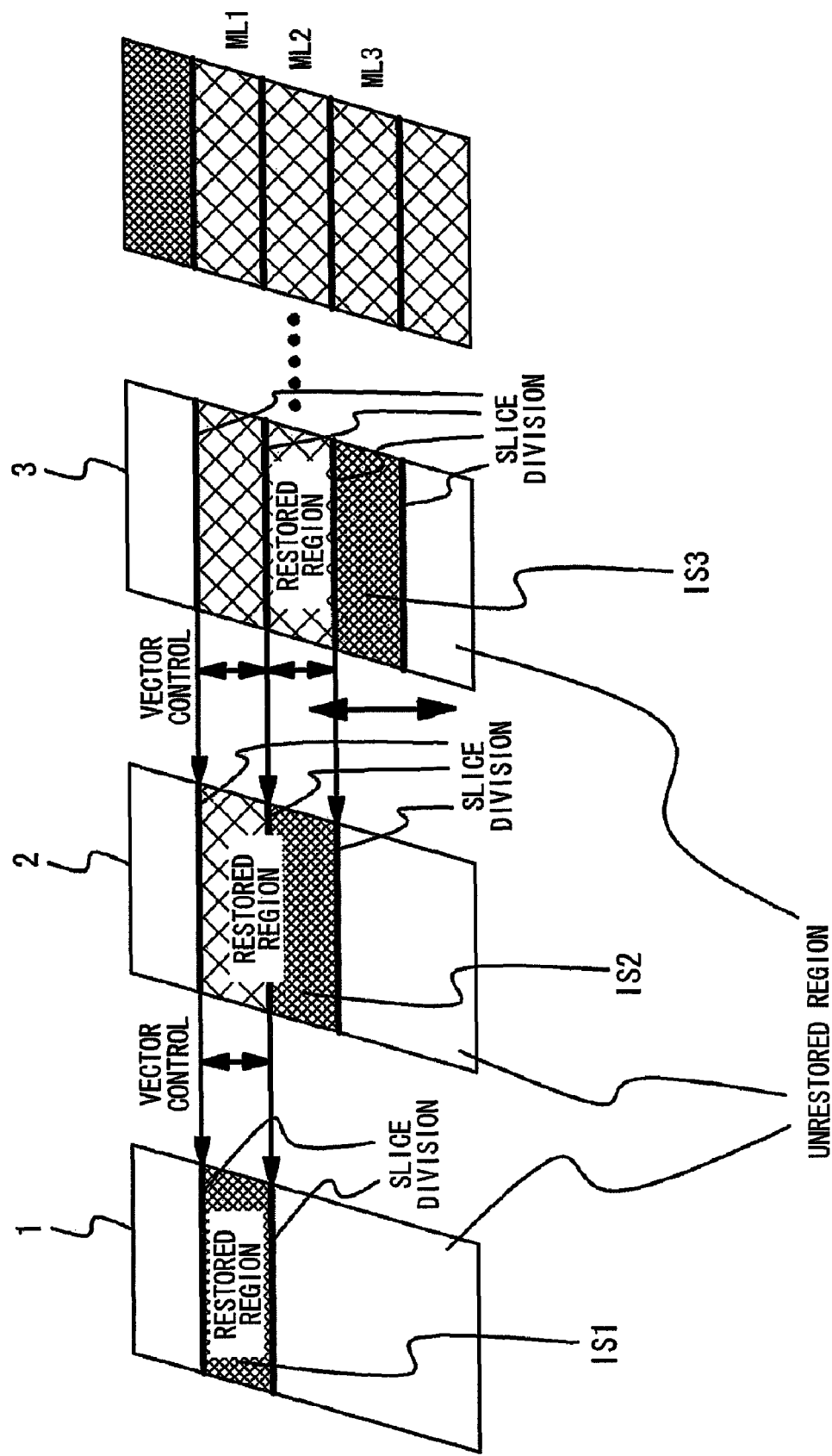
FIG. 4 is a schematic diagram for line disconnection mode.

FIG. 4 is a schematic diagram for line disconnection mode. When the line disconnection information is inputted to the encoding control changing unit 40 from the transmission monitoring unit 20, the encoding unit 30 executes the line disconnection mode. In the line disconnection mode, the vector controlling unit 32 puts an additional reference vector restriction as a reference disconnection mode vector restriction on the vector control of the intra-slice scheme.

As shown in FIG. 4, as is the case with the normal mode, as a result of the position of a macroblock line to which an intra slice is applied sequentially shifting downward on a picture-by-picture basis, the whole picture is refreshed in a fixed period.

The slice dividing unit 33 prohibits encoding in which pixels above and below an intra slice IS1 affect the intra slice IS1 in a picture 1 immediately after line disconnection. That is, the slice dividing unit 33 performs slice division at the upper and lower ends of the intra slice IS1. As a result, a macroblock line ML1 into which the intra slice IS1 is inserted becomes a restored region.

The slice dividing unit 33 performs slice division at the upper and lower ends of the macroblock line ML1 in the next picture 2. Moreover, in the picture 2, the vector controlling unit 32 makes the macroblock line ML1 refer to the intra slice IS1 of the picture 1. In addition, the intra-slice inserting unit 31 inserts an intra slice IS2 into a macroblock line ML2 situated below the macroblock line ML1. Furthermore, the slice dividing unit 33 performs slice division at the upper and lower ends of the intra slice IS2. In this case, the macroblock lines ML1 and ML2 become restored regions.

The intra-slice inserting unit 31, the vector controlling unit 32, and the slice dividing unit 33 repeat the above operation. As a result, a region (an unrestored region) situated above an intra slice of a picture immediately after line disconnection and situated below the current intra slice refers to the same region of the previous picture. This prevents a transmission error from spreading over a restored region obtained by an intra slice after line recovery.

As a result of encoding being controlled in this way, the video receiving apparatus 120 can expand a restored region from an intra slice of an arbitrary picture. That is, even when a picture in which the intra slice is inserted at some midpoint of the image plane is received first after the start of reproduction operation, the video receiving apparatus 120 can start video restoration from that picture. However, image quality might be degraded due to the reference disconnection mode vector restriction put on the vector as compared with reference normal mode vector restrictions of the intra-slice scheme.

Figure 5:
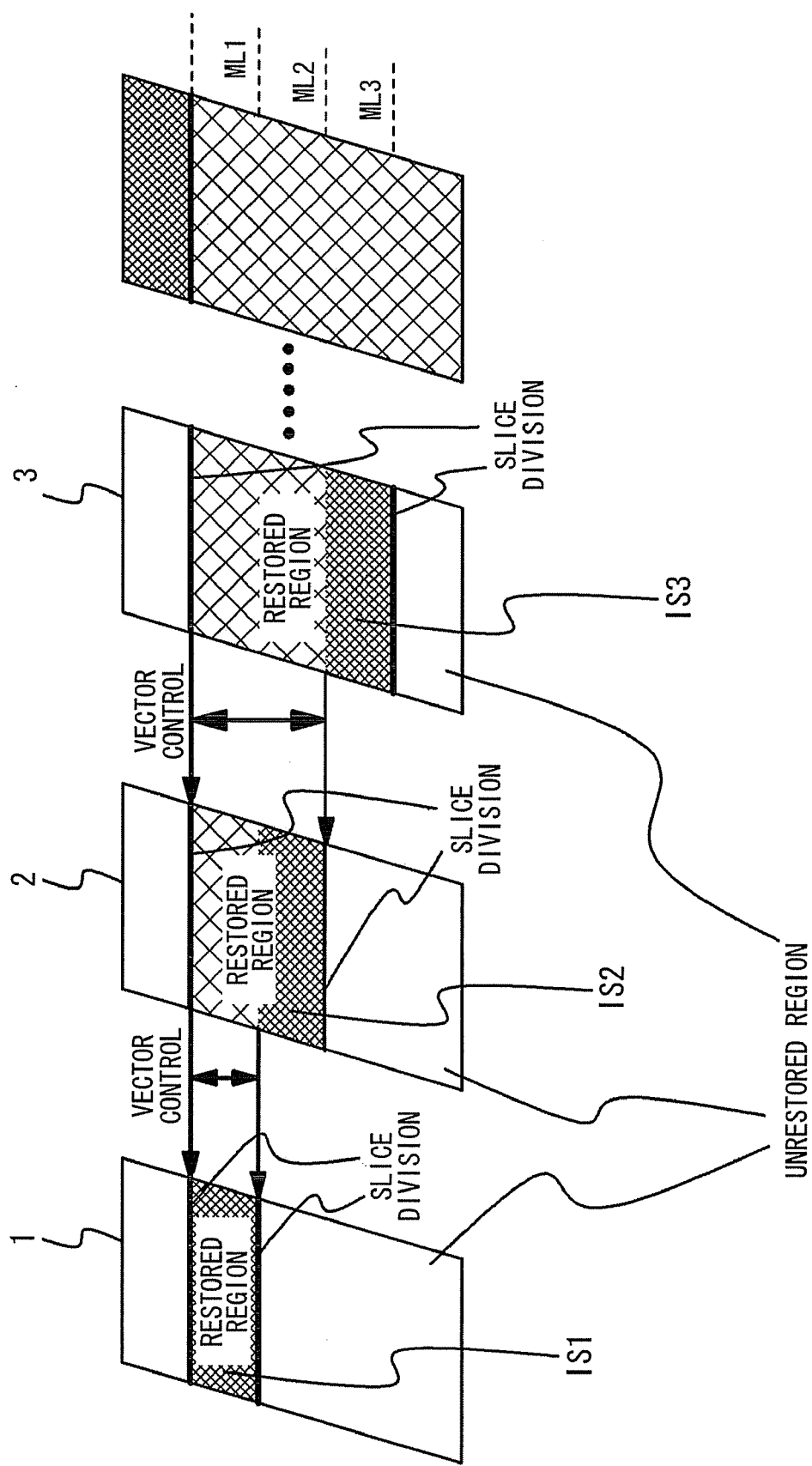
FIG. 5 is a schematic diagram for line recovery mode.

FIG. 5 is a schematic diagram for line recovery mode. When the line recovery information is inputted to the encoding control changing unit 40 from the transmission monitoring unit 20, the encoding unit 30 executes the line recovery mode. In the line recovery mode, the vector controlling unit 32 relaxes (turns off) a reference vector restriction as compared with the line disconnection mode (i.e., restores the reference disconnection mode vector restriction to the reference normal mode vector restriction).

As shown in FIG. 5, as is the case with the normal mode, as a result of the position of a macroblock line to which an intra slice is applied sequentially shifting downward on a picture-by-picture basis, the whole picture is refreshed in a fixed period.

The slice dividing unit 33 prohibits encoding in which pixels above and below an intra slice IS1 affect the intra slice IS1 in a picture 1 immediately after line recovery. That is, the slice dividing unit 33 performs slice division at the upper and lower ends of the intra slice IS1. As a result, a macroblock line ML1 into which the intra slice IS1 is inserted becomes a restored region.

In the next picture 2, the slice dividing unit 33 performs slice division at the upper end of the macroblock line ML1. Moreover, in the picture 2, the vector controlling unit 32 makes the macroblock line ML1 refer to the intra slice IS1 of the picture 1. In addition, in the picture 2, the intra-slice inserting unit 31 inserts an intra slice IS2 into a macroblock line ML2 situated below the macroblock line ML1. Furthermore, the slice dividing unit 33 performs slice division at the lower end of the intra slice IS2. As a result, the macroblock lines ML1 and ML2 become restored regions.

In the next picture 3, the intra-slice inserting unit 31 inserts an intra slice IS3 into a macroblock line ML3 situated below the macroblock line ML2. The slice dividing unit 33 performs slice division at the lower end of the intra slice IS3. This allows the vector controlling unit 32 to perform, in the picture 3, inter-encoding in which the macroblock lines ML1 and ML2 refer to the restored regions ML1 and ML2 of the picture 2.

The intra-slice inserting unit 31, the vector controlling unit 32, and the slice dividing unit 33 repeat the above operation. As a result, only the restored region can be referred to in encoding of the next picture. Moreover, for an unrestored region, as is the case with the line disconnection mode, a region (an unrestored region) situated above an intra slice of a picture immediately after line disconnection and situated below the current intra slice refers to the same region of the previous picture. This prevents a transmission error from spreading over a restored region obtained by an intra slice after line recovery.

By performing the encoding control in this way, vector restrictions are relaxed as compared to the line disconnection mode. In this case, image quality improvement is made to a picture immediately after the execution of the line recovery mode by the encoding unit 30. As a result, as the process proceeds, the image quality approaches that of the intra-slice scheme. This makes it possible to achieve the same image quality as a normal intra-slice scheme in one period of the line recovery mode. Here, up to (2× intra-refresh period−1) pictures are needed to perform video restoration only with the normal intra-slice scheme. In this embodiment, it is possible to shorten the time it takes for the video to be restored to a period equal to an intra-refresh period.

Figure 6:
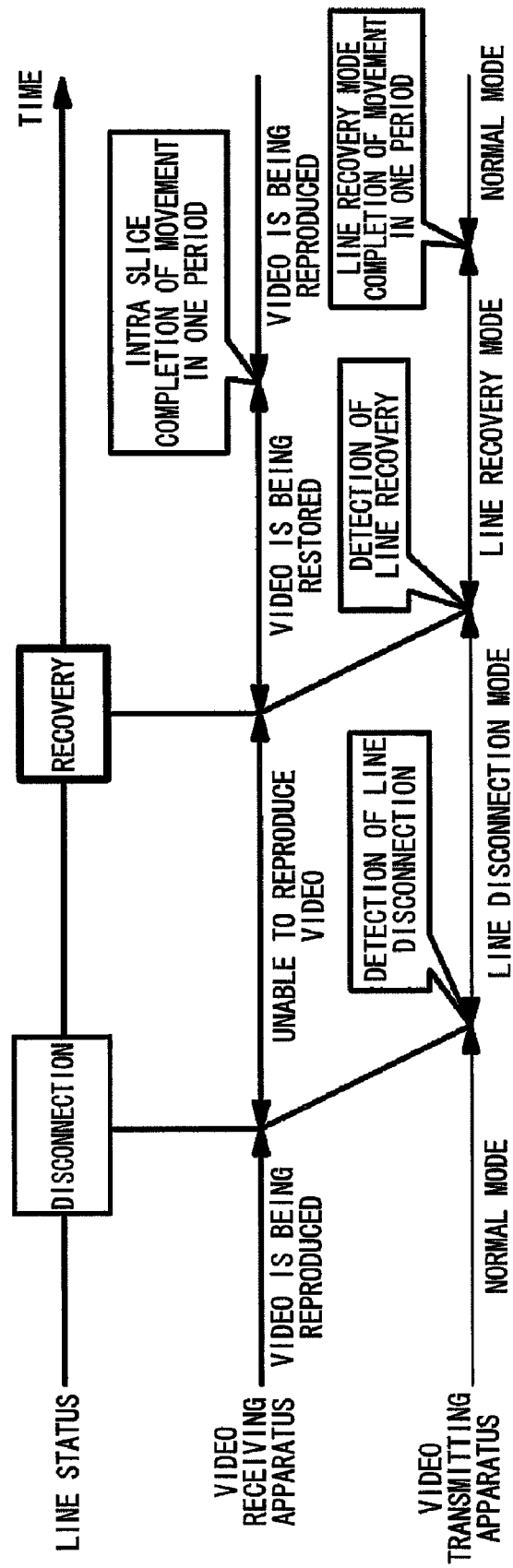
FIG. 6 is a diagram showing a time table of the video transmission system.

FIG. 6 is a diagram showing a time table of the video transmission system 200. As shown in FIG. 6, when a transmission line is connected, the video transmitting apparatus 100 executes the normal mode, and the video receiving apparatus 120 reproduces a received video stream.

When a line error such as disconnection occurs in the transmission line, the video receiving apparatus 120 becomes unable to reproduce the video stream. In this case, the transmission monitoring unit 20 detects line disconnection. As a result, the video transmitting apparatus 100 executes the line disconnection mode. When the line is recovered, the transmission monitoring unit 20 detects line recovery. As a result, the video transmitting apparatus 100 executes the line recovery mode.

When the intra slice moves throughout the whole picture in one period from a picture immediately after line recovery in the video receiving apparatus 120, the video is restored. When the intra slice moves throughout the whole picture in one period after the start of execution of the line recovery mode, the video transmitting apparatus 100 starts the execution of the normal mode.

Figure 7:
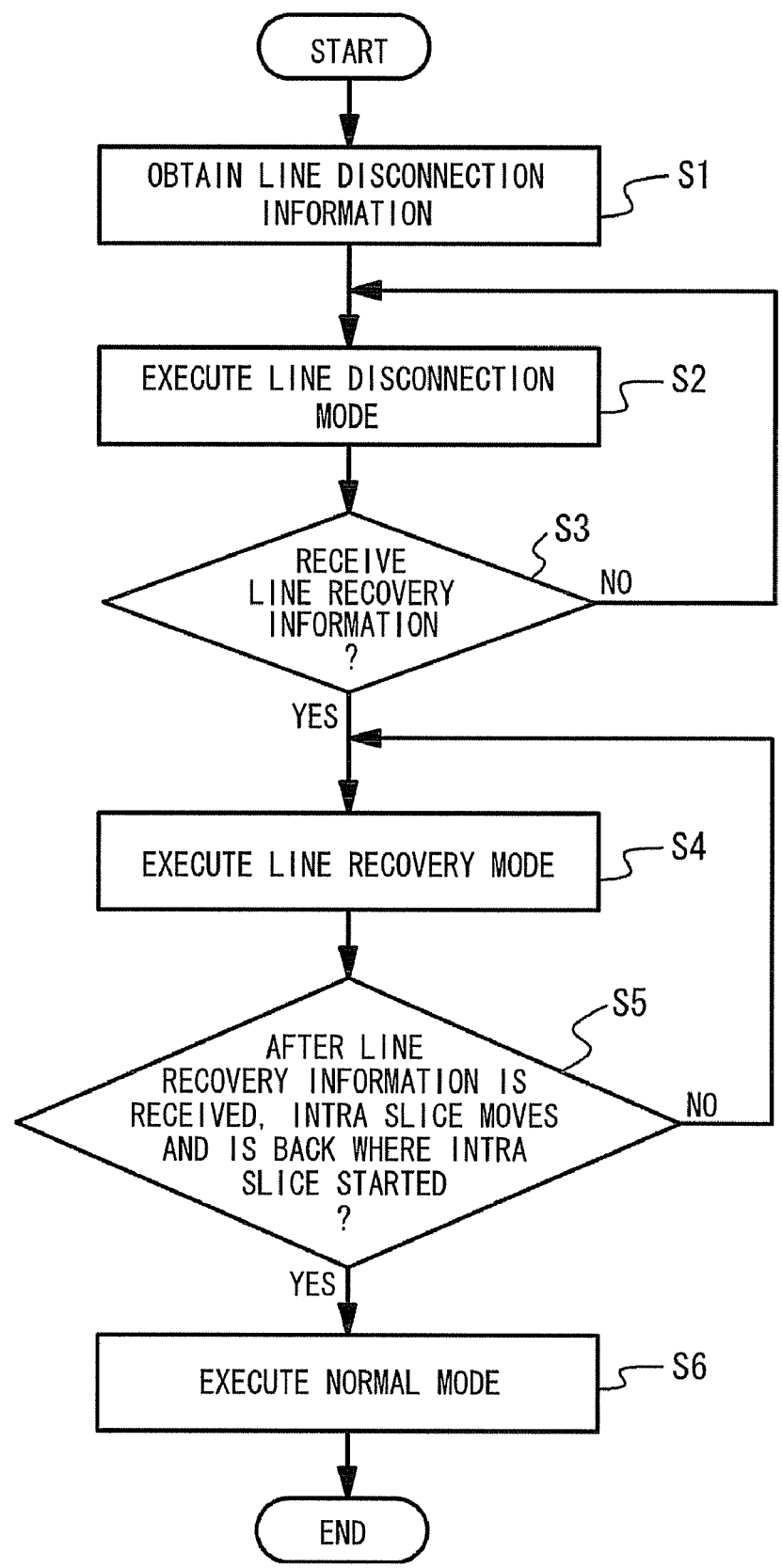
FIG. 7 is a diagram showing an example of a flow chart in which line disconnection switches to the normal mode.

FIG. 7 is a diagram showing an example of a flow chart when line disconnection occurs during execution of the normal mode. As shown in FIG. 7, the encoding control changing unit 40 obtains line disconnection information from the transmission monitoring unit 20 (step S1). Next, the encoding unit 30 executes the line disconnection mode (step S2).

Next, the encoding control changing unit 40 judges whether or not line recovery information is received (step S3). In step S3, if the line recovery information is found not to be received, the encoding control changing unit 40 executes step S2 again.

If the line recovery information is found to be received in step S3, the encoding unit 30 executes the line recovery mode (step S4). Next, the encoding unit 30 judges whether or not the intra slice moves and is back where the intra slice started after the receipt of the line recovery information (step S5).

If the intra slice is found in step S5 not to move and be back where the intra slice started, the encoding unit 30 executes step S4 again. If the intra slice is found in step S5 to move and be back where the intra slice started, the encoding unit 30 executes the normal mode (step S6). Then, the execution of the flow chart is ended.

Incidentally, the transmission monitoring unit 20 may detect video restoration completion from the video receiving apparatus 120. For example, the transmission monitoring unit 20 transmits video restoration completion information to the encoding unit 30 when detecting video restoration completion. Upon receipt of the video restoration completion information, the encoding unit 30 stops the execution of the line recovery mode, and executes the normal mode.

Figure 8:
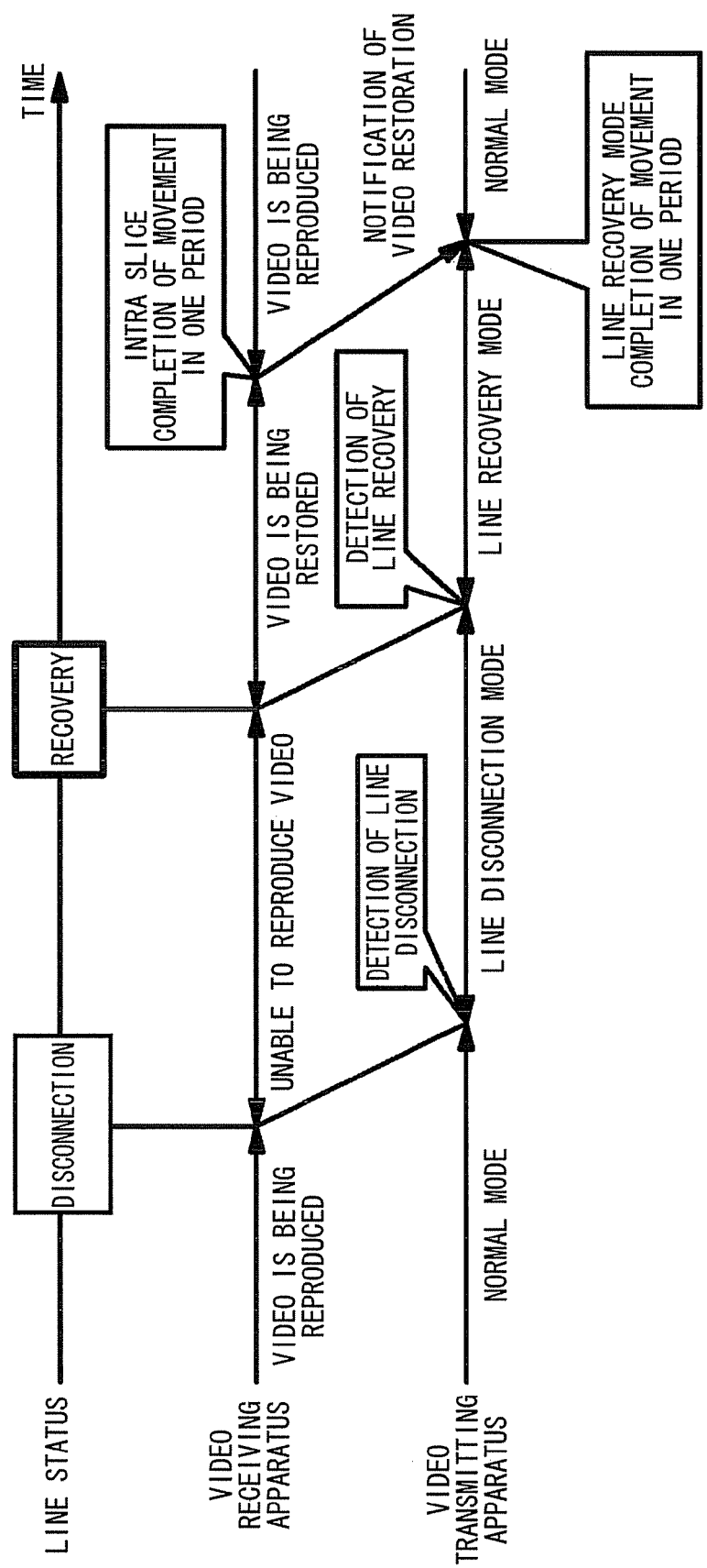
FIG. 8 is a diagram showing a time table when a transmission monitoring unit detects video restoration completion.

FIG. 8 is a diagram showing a time table when the transmission monitoring unit 20 detects video restoration completion. As shown in FIG. 8, when an intra slice moves throughout the whole picture in one period after the video transmitting apparatus 100 starts to execute the line recovery mode, the transmission monitoring unit 20 transmits video restoration information to the video transmitting apparatus 100. Upon receipt of the video restoration information, the video transmitting apparatus 100 starts to execute the normal mode.

Figure 9:
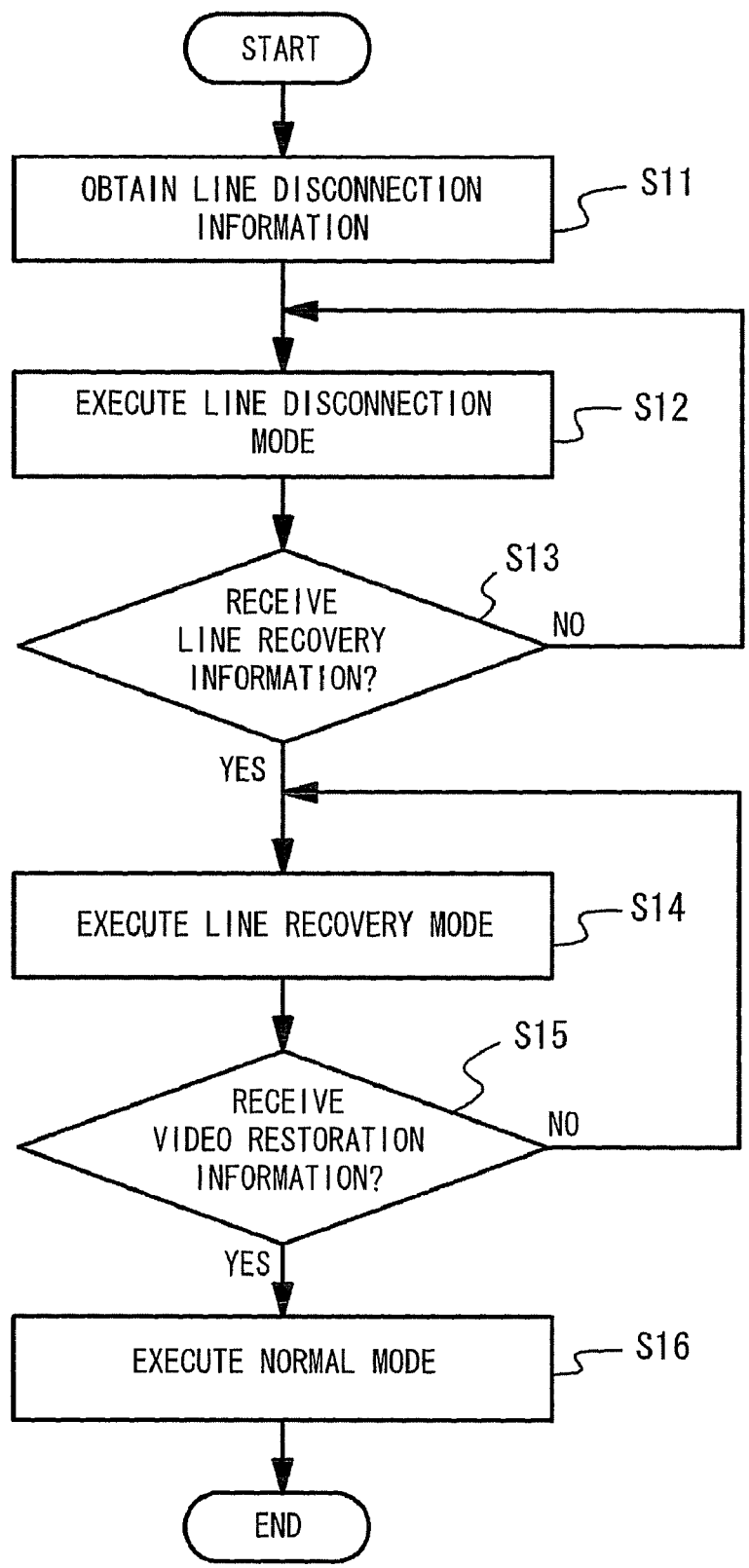
FIG. 9 is a diagram showing an example of a flow chart when the transmission monitoring unit detects video restoration completion.

FIG. 9 is a diagram showing an example of a flow chart when the transmission monitoring unit 20 detects video restoration completion. As shown in FIG. 9, the encoding control changing unit 40 obtains line disconnection information from the transmission monitoring unit 20 (step S11). Next, the encoding unit 30 executes the line disconnection mode (step S12).

Next, the encoding control changing unit 40 judges whether or not line recovery information is received (step S13). If the line recovery information is found not to be received in step S13, the encoding control changing unit 40 executes step S12 again.

If the line recovery information is found to be received in step S13, the encoding unit 30 executes the line recovery mode (step S14). Next, the encoding unit 30 judges whether or not video restoration information is received (step S15).

If the video restoration information is found not to be received in step S15, the encoding unit 30 executes step S14 again. If the video restoration information is found to be received in step S15, the encoding unit 30 executes the normal mode (step S16). Then, the execution of the flow chart is ended.

According to the flow chart of FIG. 9, it is possible to shorten the time for the transition from line disconnection to the normal mode.

As described above, according to the video transmitting apparatus and the video transmitting method disclosed in the embodiment of the invention, it is possible to shorten the time it takes for the video to be restored. According to an aspect of an embodiment, the transmission line can be wire and/or wireless data transmission. According to an aspect of an embodiment, a video transmitting apparatus communicably connectable to a video receiving apparatus includes a programmed computer processor capable of executing an intra-slice encoding scheme on video data, detecting disconnection and recovery of a transmission line between the video apparatus and the video receiving apparatus; at a time of transmission line disconnection, preventing a transmission error from falling within a pixel macroblock line of an intra slice where the transmission error occurs in a motion vector by encoding the video data to turn on a reference disconnection mode vector restriction on the motion vector, and at a time of line recovery, only preventing a transmission error from spreading over to a lower region of a motion vector including a predetermined pixel macroblock line of an intra slice by encoding the video data turning off the reference disconnection mode vector restriction on the motion vector.

Therefore, according to an aspect of the embodiments of the invention, any combinations of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the video transmitting apparatus 100, video receiving apparatus 120, imagin unit 110, etc.) comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include two or more apparatuses in computer network communication with each other or other apparatuses. The results produced can be displayed on the display. A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

Although the embodiment of the present invention has been described in detail, it is to be noted that the present invention is not limited in any way by the embodiment thereof described above, and that many modifications and variations are possible within the scope of the subject matter of the present invention recited in the claims.

What is claimed is:

1. A video transmitting apparatus that communicates with a video receiving apparatus, comprising:
   a moving image encoding unit performing an encoding process using an intra-slice scheme; and
   a transmission monitoring unit detecting disconnection and recovery of a transmission line,
   wherein, at a time of transmission line disconnection, the moving image encoding unit performs an encoding process on a picture by putting reference restrictions on a motion vector so that a transmission error falls within a pixel macroblock line where the transmission error occurs, and, at a time of transmission line recovery, the moving image encoding unit performs an encoding process on a picture by putting the reference restrictions on a motion vector so that a transmission error only does not spread over a lower region including a predetermined pixel macroblock line, and
   wherein a refreshing occurs after a reference restriction on the motion vector is lifted.

2. The video transmitting apparatus according to claim 1, wherein
   the moving image encoding unit comprises a motion vector controlling unit making each pixel macroblock line refer to a same pixel macroblock line of a previous picture in a region other than an intra slice inserted into a pixel macroblock line of a picture after detection of transmission line disconnection.

3. The video transmitting apparatus according to claim 1, wherein the moving image encoding unit comprises a motion vector controlling unit setting, as a motion vector reference region, a region above an intra slice in a previous picture and below an intra slice in a picture immediately after detection of line recovery for a macroblock line in a region situated above an intra slice inserted into a macroblock line and below an intra slice inserted into a macroblock line of a picture immediately after detection of line recovery in a picture after detection of line recovery.

4. The video transmitting apparatus according to claim 3, wherein
   after the intra slice moves from a picture immediately after detection of transmission line recovery and is back where the intra slice started, the moving image encoding unit performs an encoding process lifting the reference restrictions on a motion vector reference region for having the transmission error fall within a pixel macroblock line.

5. The video transmitting apparatus according to claim 3, wherein
   when the transmission monitoring unit obtains video restoration completion information from the video receiving apparatus, the moving image encoding unit performs an encoding process lifting the reference restrictions on a motion vector reference region for having the transmission error fall within a pixel macroblock line.

6. A video transmitting method comprising:

encoding video data using an intra-slice scheme; and detecting disconnection and recovery of a transmission line to a video receiving apparatus, wherein the encoding, at a time of transmission line disconnection, encodes a picture by putting reference restrictions on a motion vector so that a transmission error falls within a pixel macroblock line where the transmission error occurs, and the encoding, at a time of transmission line recovery, encodes a picture by putting the reference restrictions on a motion vector so that a transmission error only does not spread over a lower region including a predetermined pixel macroblock line, and wherein a refreshing occurs after a reference restriction on the motion vector is lifted.

7. The video transmitting method according to claim 6, wherein the encoding further comprises making each pixel macroblock line refer to a same macroblock line of a previous picture, in a region other than an intra slice inserted into a pixel macroblock line of a picture after the detection of line disconnection.

8. The video transmitting method according to claim 6, wherein the encoding control step comprises a motion vector control step of setting, as a motion vector reference region, a region above an intra slice in a previous picture and below an intra slice in a picture immediately after detection of line recovery for a macroblock line in a region situated above an intra slice inserted into a macroblock line and below an intra slice inserted into a macroblock line of a picture immediately after detection of line recovery in a picture immediately after detection of line recovery.

9. The video transmitting method according to claim 8, wherein the encoding, after the intra slice moves from a picture immediately after detection of transmission line recovery and is back where the intra slice started, lifts the reference restrictions on a motion vector reference region for having the transmission error fall within a pixel macroblock line.

10. The video transmitting method according to claim 8, wherein the encoding, when a video restoration completion information is obtained from the video receiving apparatus, lifts the reference restrictions on a motion vector reference region for having the transmission error fall within a pixel macroblock.

11. A video transmitting apparatus communicably connectable to a video receiving apparatus, comprising:

a computer processor performing:

executing an intra-slice encoding scheme on video data, detecting disconnection and recovery of a transmission line, at a time of transmission line disconnection, preventing a transmission error from falling within a pixel macroblock transmission of an intra slice where the transmission error occurs in a motion vector by encoding the video data to turn on a reference disconnection mode vector restriction on the motion vector, and at a time of line recovery, only preventing a transmission error from spreading over to a lower region of a motion vector including a predetermined pixel macroblock transmission of an intra slice by encoding the video data turning off the reference disconnection mode vector restriction on the motion vector, and wherein a refreshing occurs after a reference restriction on the motion vector is lifted.

* * * * *